United States Patent
Nyeboer

(10) Patent No.: US 7,083,369 B2
(45) Date of Patent: Aug. 1, 2006

(54) COLLAPSIBLE CONTAINER WITH DUNNAGE ERECTION BIASER

(75) Inventor: Calvin D. Nyeboer, Holland, MI (US)

(73) Assignee: Bradford Company, Holland, MI (US)

( * ) Notice: Subject to any disclaimer, the term of this patent is extended or adjusted under 35 U.S.C. 154(b) by 48 days.

(21) Appl. No.: 11/006,958

(22) Filed: Dec. 8, 2004

(65) Prior Publication Data
US 2006/0120820 A1 Jun. 8, 2006

(51) Int. Cl.
B61D 3/16 (2006.01)

(52) U.S. Cl. ........................................ 410/43

(58) Field of Classification Search ........... 410/31–32, 410/43, 46, 52, 77–78, 85, 117–118, 156, 410/89; 211/13.1, 71.01, 85, 195; 206/600, 206/517, 577
See application file for complete search history.

(56) References Cited

U.S. PATENT DOCUMENTS

| | | | | |
|---|---|---|---|---|
| 3,946,876 A | * | 3/1976 | Jay ........................... | 211/60.1 |
| 4,309,013 A | * | 1/1982 | Howe et al. .............. | 248/346.3 |
| 4,638,744 A | * | 1/1987 | Clive-Smith ............... | 108/56.1 |
| 5,005,255 A | | 4/1991 | Pare et al. | |
| 5,168,601 A | | 12/1992 | Liu | |
| 5,228,821 A | * | 7/1993 | Gleffe et al. ................ | 414/403 |
| 5,242,255 A | * | 9/1993 | Gleffe et al. ................ | 414/403 |
| 5,439,152 A | * | 8/1995 | Campbell .................... | 224/405 |
| 5,725,119 A | | 3/1998 | Bradford et al. | |
| 5,897,012 A | | 4/1999 | Sortwell | |
| 6,230,916 B1 | | 5/2001 | Bradford et al. | |
| 6,382,573 B1 | | 5/2002 | Cepeda | |
| 6,497,542 B1 | * | 12/2002 | Vermeulen ................... | 410/43 |
| 6,540,096 B1 | | 4/2003 | Bazany et al. | |
| 6,581,245 B1 | | 6/2003 | Jen | |
| 6,655,300 B1 | * | 12/2003 | Clive-Smith et al. ...... | 108/53.5 |

FOREIGN PATENT DOCUMENTS

| | | |
|---|---|---|
| GB | 2369351 | 5/2002 |
| WO | WO 93/10024 | 5/1993 |
| WO | WO 2004/035402 | 4/2004 |

* cited by examiner

Primary Examiner—H Gutman
(74) Attorney, Agent, or Firm—Wood, Herron & Evans, LLP

(57) ABSTRACT

A reusable and returnable container for holding product therein during shipment and subsequently being returned without product comprises a body having at least two opposed side structures, collapsible dunnage operably connected to the side structures, and a dunnage erection biaser operably connected to one of the side structures. The force needed to erect the dunnage is minimized due to the dunnage erection biaser. The dunnage erection biaser, in one embodiment is a pair of torsion springs. However, the biaser may be any elastic or non-elastic device to facilitate erection of collapsed dunnage.

24 Claims, 4 Drawing Sheets

COLLAPSIBLE CONTAINER WITH DUNNAGE ERECTION BIASER

FIELD OF THE INVENTION

The present invention relates generally to shipping containers used to ship products, and more specifically to collapsible containers which are returnable in an empty state for reuse.

BACKGROUND OF THE INVENTION

Returnable and reusable containers are utilized by manufacturers to ship a variety of different products to end users, such as assembly plants. For example, an automobile assembly plant utilizes parts from a number of different parts manufacturers or suppliers. These suppliers ship their respective parts to the assembly plant in reusable containers, and the parts are then removed from the containers, assembled into a finished product, and the empty containers are then returned to the parts suppliers for use in subsequent shipments.

The return and reuse of empty containers results in a substantial cost savings for the supplier and/or the end manufacturer or assembler because reuse reduces the number of new containers which must be purchased. Furthermore, the returned containers alleviate the assembly plant's task and associated costs with storing, destroying, or otherwise disposing of the containers.

While returnable and reusable containers reduce costs by eliminating the need to constantly purchase new containers and reduce disposal costs, it may still be relatively costly to provide for their return shipment. The shipping rate for return shipment of empty containers is typically based upon the volume of the container and upon the number of containers which might be situated in a return vehicle. Historically, there was a one-to-one (1:1) return-to-shipment ratio because an empty container occupied the same shipping space or volume as a full container. Therefore, there was not much of a shipping cost savings when returning empty reusable containers even though empty containers weighed less.

Furthermore, the cost of storing conventional reusable containers may further reduce the other economic benefits they offer because empty containers also require the same warehouse or storage space as full containers. Container storage may be necessary at the plant before a return shipment can be arranged. Similarly, the supplier will store containers on site so as to have them ready for shipment. Storage space is valuable and may be limited, and it is usually desirable to utilize the space for something other than bulky, empty containers waiting to be shipped or returned. Therefore, the economic benefits provided by currently available reusable containers is reduced by the cost, both to the end user assembly plant and supplier, of return shipment and pre-return or post-return storage space requirements.

Some currently available reusable containers have addressed such problems by being collapsible into a smaller size or volume to thereby require less space when returned or stored. For example, some available reusable containers are collapsible into a volume essentially one-third (⅓) or one-fourth (¼) of their volume when shipped full of product. This provides a three-to-one (3:1) or four-to-one (4:1) return-to-shipment ratio, and thus, provides a substantial savings in return shipment costs. That is, a truck returning the containers to the originating site can carry three or four times the number of empty, collapsed containers as full containers. Additionally, collapsed, stored containers require substantially less storage space.

While such containers address the issue of return shipment and storage costs, they still have certain drawbacks. For example, for the containers to be collapsible, it is necessary to utilize separate dunnage elements, such as partitions or separating structures, in the container during shipment. Dunnage elements are used for separating and protecting the products shipped in the container. The dunnage elements must be handled separately from the container during shipment and return. That is, when the container has been assembled into an erected form for shipment and dunnage elements are to be utilized, the dunnage must be separately inserted and secured within the container. Subsequently, prior to return shipment, any dunnage elements utilized within the container must be detached and removed therefrom before the container can be collapsed into the smaller, returnable shape. The dunnage elements are then discarded or otherwise disposed of by the assembly plant, further adding to the plant's overall cost for the shipment.

Furthermore, the supplier incurs additional costs by constructing or acquiring new dunnage elements each time the returned container is reused. Additionally, the labor costs associated with constructing and installing dunnage elements in a container, and the additional labor for collapsing, removing and disposing of the dunnage elements after shipment, further increases the overall cost of shipping product utilizing conventional containers. Therefore, even with existing collapsible, returnable containers, high shipping costs may be incurred on both ends, i.e., by the supplier who constantly acquires new dunnage elements and by the assembly plant which constantly must dispose of the old dunnage elements or pay to have those dunnage elements returned with the container.

Moreover, dunnage elements, depending on the size of the container, may be heavy, and as such, the assembly of the dunnage elements to accept a product can be physically stressful for the worker and may lead to job related injuries. Job related injuries increase costs. Additionally, because someone must physically assemble the dunnage, the dunnage elements and the containers have been limited in size and weight in accordance with what an average worker can physically and safely erect.

Access to the product in the containers is also a particular concern. Specifically, in the automotive industry, containers full of product are positioned on an assembly line adjacent to a work area which is associated with a particular product to be installed on a manufactured vehicle. For example, at a line position or station where interior door panels are installed onto a door, a container full of door panels is positioned at the station for access by the line worker. The product or part is taken directly from the container and is used on the line. However, access to some existing containers may be difficult when removing a parts to install. Because, a line worker only has a certain amount of time to install a part, any delay in accessing a part is undesirable. Furthermore, the repetitive motion of accessing parts to install on a vehicle from some containers can be difficult or straining to line workers since it must be done many times during a shift. Likewise, repetitively having to assemble or erect a dunnage structure can be wearisome for workers.

Some existing products have recognized some of these needs and have provided returnable, collapsible containers with integral dunnage. For example, U.S. Pat. Nos. 5,725, 119; 6,062,410; 6,230,916 and 6,540,096, all of which are fully incorporated by reference herein, illustrate various containers and structures. While such products have provided many desirable benefits, such as reducing overall container and shipping costs, improvements are still desirable.

Accordingly, it is an objective of the present invention to reduce the force required to erect a dunnage structure in a returnable and reusable container.

It is further an objective of the present invention to allow larger or heaver dunnage systems to be used in returnable and reusable containers without increasing the required lifting force that must be applied to erect such dunnage.

It is also an object of the present invention to allow for the use of larger collapsible containers with more dunnage to allow shipment of more parts than heretofore possible.

It is further an objective of the present invention to reduce the likelihood of on the job injuries related to the assembly or erection of a dunnage structure within a returnable and reusable container.

These objectives and other objectives will become more readily apparent from the further description of the invention below.

SUMMARY OF THE INVENTION

The above objectives and other objectives are addressed by the present invention, which provides a container, typically a reusable and returnable container, that has a body having at least two opposed side structures, collapsible dunnage extending between the two opposed side structures, and a dunnage erection biaser operably connected to one of the side structures. The force needed to erect the dunnage for use is minimized through use of the dunnage erection biaser.

The dunnage erection biaser may comprise an elastic or non-elastic device. The biaser may be comprised of rubber or it may be one or springs, e.g., torsion springs or leaf springs, that facilitate erection of the container and/or dunnage. Alternatively, the dunnage erection biaser may use other types of springs or other devices such as sheaves, pulleys, block and tackles, counterweights, etc., singularly or in combination with one another. In any configuration, the dunnage erection biaser, along with the dunnage, remains with the container when the empty container is returned to be loaded again.

In one preferred embodiment, the container comprises a body having at least two opposing and moveable side walls. The side walls are configured for being selectively moved into an erected position for product shipment and then moved into a collapsed position for reducing the size of the empty container for return shipment. In one embodiment of the invention, the return-to-shipment volume ratio is approximately 2:1.

For retaining product within the container, collapsible dunnage spans between at least two side structures. In one embodiment, the dunnage is movable to an erected position for receiving product when the side walls and frame are erected. The dunnage also moves to a collapsed position in the container body when the side walls and frame are collapsed, so that the dunnage remains with the container when returned. In that way, the dunnage in the container is also reusable, reducing dunnage replacement costs, and also reducing and/or eliminating labor costs associated with handling and discarding used dunnage from a container and assembling new dunnage prior to the container being loaded with product and shipped.

In a preferred embodiment, the container has an open side for horizontal loading of product into the dunnage. The open side is in alignment with the dunnage for providing access to the dunnage and product within the dunnage from the side of the container. The product in the container may thus be transferred into and out of the container easily and efficiently in a process known in the art as horizontal loading. The present invention is particularly useful for assembly line use as product in the container may be removed and transferred to an assembly line in one smooth movement. Unnecessary lifting of the product is reduced and/or eliminated to further assist an assembly line worker or other person using the shipped products.

In a preferred embodiment, a frame is incorporated into the container. A portion of the frame may be pivotally coupled with respect to the remainder of the frame so an upper portion of the frame may be moved between a collapsed and erected position. Pivotal joints are biased with a dunnage erection biaser, e.g., a torsion spring, which minimizes the force needed to erect one of the side structures and associated dunnage of a collapsed container. A latching structure coupled to the body secures the frame in an erected position. Preferably, two opposing latching structures are utilized to maintain the upper portion of the frame in an erect condition. The latching structures may be any known in the art.

In accordance with another aspect of the present invention, the dunnage comprises a plurality of pouches which are coupled at their ends to opposing side structures. Specifically, rails may extend along the upper edges of opposed side structures and the dunnage pouches are coupled to the rails. In one embodiment, the dunnage pouches are slidably coupled to the rails. The pouches may be sealed at their top, or be open at the top, to allow top and/or side access to products within the pouches.

Due at least in part to the dunnage erection biasers, the present invention reduces the force needed to erect the containers and attached dunnage.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION

Figure 1:
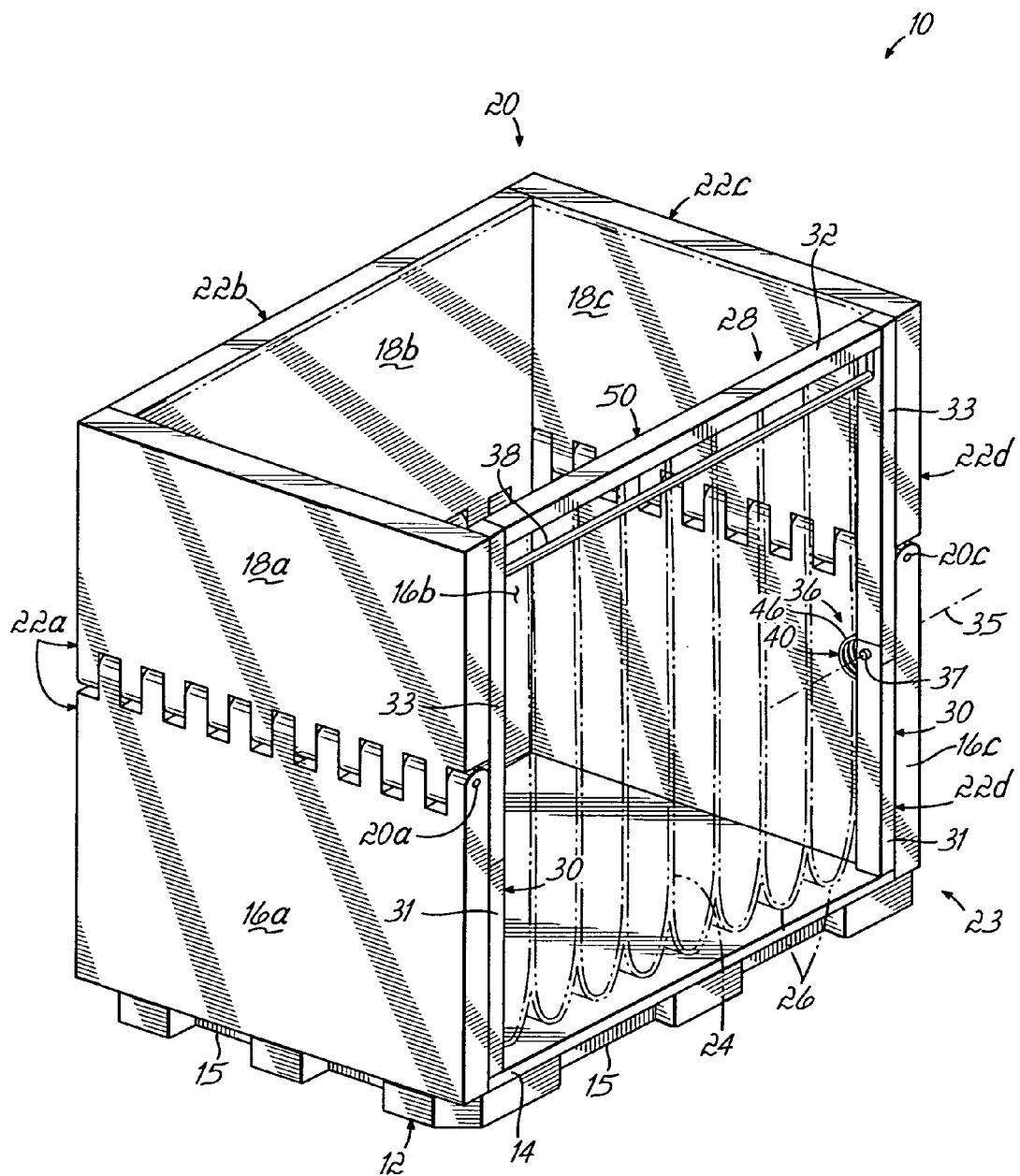
FIG. 1 is a perspective view of a preferred embodiment of the collapsible container of the invention, showing the container erected with a dunnage structure in an erected position for holding product for shipment or storage.

FIG. 1 shows a container 10 having a base 12 having a bottom portion 14 and three fixed, upstanding vertically oriented wall portions 16a, 16b and 16c extending upwardly from the perimeter of the bottom portion 14 of the base 12. A rear wall 18b and side walls 18a, 18c are hingedly connected to the vertically oriented wall portions 16b and 16a, 16c of the base 12, respectively. Side wall 18a is hingedly or pivotally joined to the wall portion 16a of the base 12 with a hinge pin 20a so that the side wall 18a may move or pivot from a collapsed position shown in FIG. 3D to an erected position shown in FIG. 3A. Similarly, rear wall 18b is hingedly or pivotally joined to the wall portion 16b of the base 12 with a hinge pin 20b (see FIG. 3A) so that the rear wall 18b may move or pivot from a collapsed position shown in FIG. 3D to an erected position shown in FIG. 1. Lastly, side wall 18c is hingedly or pivotally joined to the wall portion 16c of the base 12 with a hinge pin 20c so that the side wall 18c may move or pivot from a collapsed position shown in FIG. 3D to an erected position shown in FIG. 3A Although one type of hinge is illustrated to connect the rear and side walls 18b, 18a, 18c to the base 12, any other type of hinge or connection may be used as desired.

The combination of the wall portion 16a of the base 12 and the side wall 18a make up a side wall structure 22a. Similarly, the wall portion 16c of the base 12 and the side wall 18c make up another side wall structure 22c on the opposite side of the container 10. Lastly, the rear or back wall portion 16b of the base 12 and the rear wall 18b make up a rear wall structure 22b.

The container 10 may also have a top and a side structure opposite rear wall structure 22b (neither shown). The base 12 may be a pallet-type base having a plurality of slots or grooves 15 formed therein for receiving the forks of a lift truck or any other configuration. Although one configuration of base 12 is illustrated, other types or configurations of bases may be used in accordance with the present invention.

In the embodiment of the invention illustrated, the base 12 and walls 18a–18c make up the overall body 20 of the container 10. Therefore, the embodiment of the container illustrated in FIG. 1 has a box-like shape. Container. 10, and particularly the body 20 of the container 10, is made of a suitably rugged material, such as a strong, durable plastic, metal, or chipboard, or the like. Containers which may be adapted or configured to include various invention features in accordance with the aspects of the present invention, are available from Ropak Corporation of Georgetown, Ky. A Ropak collapsible container may be retrofitted in accordance with the principles of the present invention to yield the inventive container having the various benefits discussed herein. Other collapsible containers may be adapted in accordance with the present invention.

The walls 18a–18c of the container 10 are configured for being selectively moved, hinged or pivoted between an erected position and a collapsed position. In the erected position, as shown in FIG. 1, the container 10 is suitable for containing product for shipment (not shown). In the collapsed position, as shown in FIG. 3D, the size of the container 10 is reduced so that the container 10 may be return shipped in a more cost effective manner. To that end, the walls 18a–18c in the illustrated embodiment are hinged so that the walls 18a–18c may be moved from a locked, erected position to an unlocked, collapsed position.

Therefore, each wall structure 22a–22c essentially has a movable top or upper portion 18a–18c, respectively, and a stationary bottom or lower portion 16a–16c, respectively. The top portion 18a–18c is hinged inwardly (see FIG. 3D) with respect to the lower portion 16a–16c to generally reduce the size of the container 10 by half when the container 10 is in the collapsed position. The bottom portions 16a–16c of each wall structure 22a–22c remain in a vertically upright position, even when the container 10 is in a collapsed position (see FIG. 3D).

Container 10 further comprises a front wall structure 22d which comprises a frame 28 in combination with the bottom portion 14 of the base 12. The frame 28 and bottom portion 14 of the base 12 define an open side 23 which allows side access to product in the dunnage structure or dunnage 24. Front wall structure 22d, like wall structures 22a–22c has a movable or hinged top or upper portion and a stationary bottom or lower portion as will be described below, in the illustrated embodiment. For purposes of the present document, any of the structures 22a–d may be considered a side structure.

As best illustrated in FIG. 1, container 10 further comprises collapsible dunnage 24 in the form of pouches 26. Each of the pouches 26 is configured to contain at least one product (not shown) such as an automobile door, for example. However, the dunnage may assume other configurations, such as intersecting partitions, if desired.

Referring to FIG. 1, the dunnage 24 is accessible through the frame 28 of the container 10. This type of container is known in the industry as a horizontal dispensing container. The dunnage 24 is operably coupled to and extends between the frame 28 and rear wall 18b, from front to back. Preferably, for efficient use of space within container 10, the dunnage 24 is also wide enough to fill the space between the opposing side wall structures 22a and 22c. That is, the dunnage 24 will preferably use as much available space in the container 10 as possible so that a maximum amount of product (not shown) may be shipped in the container 10.

Figure 2:
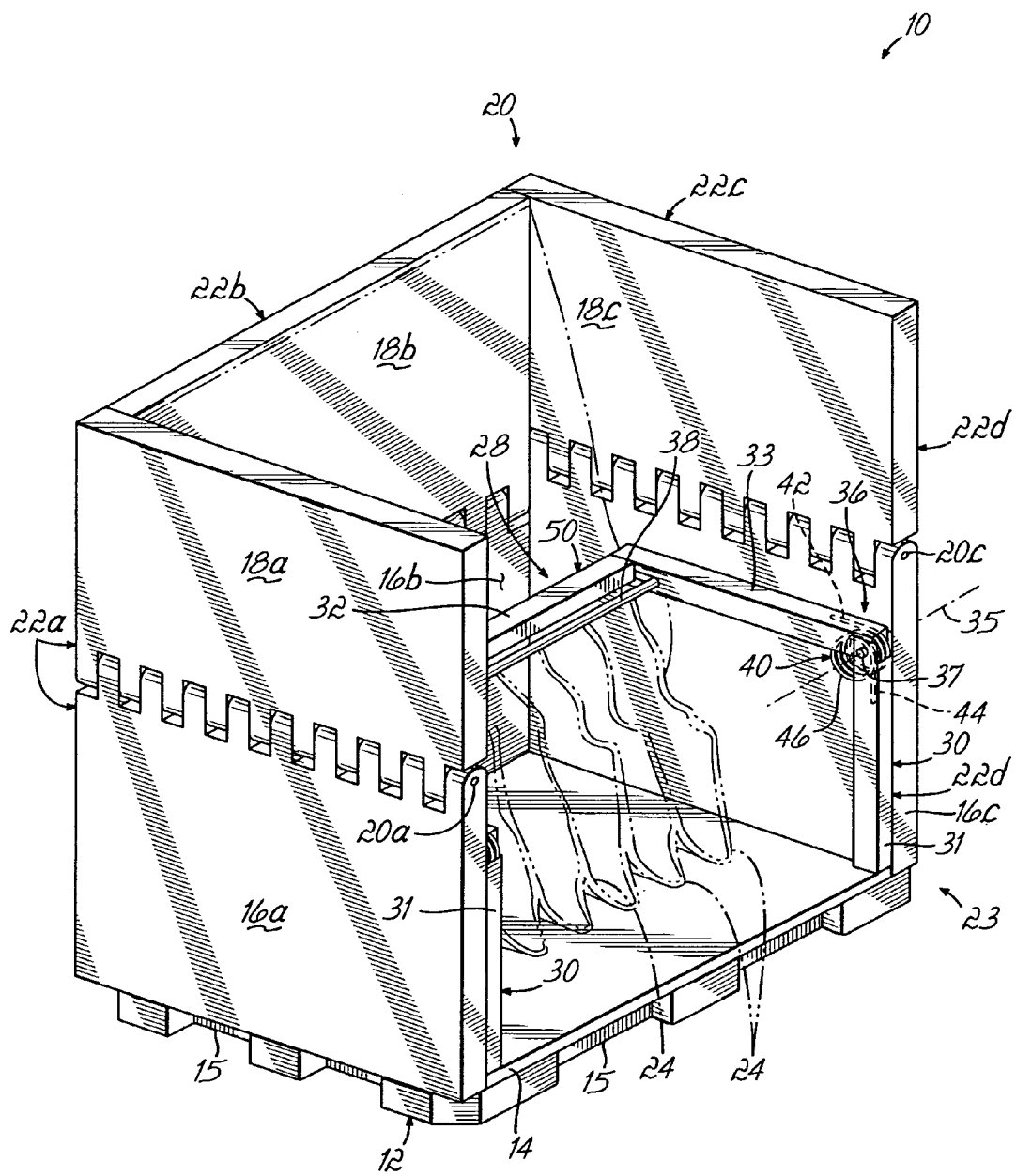
FIG. 2 is a perspective view of the collapsible container of FIG. 1, showing the frame and dunnage being collapsed.

In the erected position, the dunnage 24 receives and contains product for shipment. The dunnage 24, as shown in FIG. 2, is collapsible and stays within the body 20 of the container 10 when the walls 18a–18c and a portion of the frame 28 are collapsed. In that way, the dunnage 24 remains with the container 10 when the empty container is returned to be refilled. See FIG. 3D. When the container 10 is again erected by moving the walls 18a–18c and an upper portion of the frame 28 to an erected position and locking them in such a position, the dunnage 24 is erected and may again be utilized for shipping and containing product, as discussed further hereinbelow. Further discussion of collapsible dunnage is set forth in U.S. Pat. Nos. 5,725,119; 6,062,410; 6,230,916 and 6,540,096, all fully incorporated by reference herein.

As best illustrated in FIG. 2, frame 28 includes a pair of side frame members 30 and a top frame member 32 extending between the side frame members 30. Each of the side frame members 30 has a lower or bottom portion 31 and an upper or top portion 33. The upper portion 33 is hingedly coupled to the lower portion 31 to be selectively pivoted between a collapsed position and erected position about a horizontal pivot axis 35 which is defined by a pin 37. See FIGS. 1 and 2. The interaction between the upper and lower portions 33, 31 of the side frame members 30 define pivotal joints 36.

In alternative embodiments, the upper portion 33 of each side frame member 30 may be hingedly attached to the respective side walls, 18a, 18c of the container 10. In such an embodiment, the lower, stationary portions 31 of the side frame members would be missing. In such an embodiment, a frame section is attached to the lower wall portions 16a and 16c of the base 12. While the drawings illustrate the use of a pair of pivotal or hinged joints 36, in alternative embodiments, the frame 22 could have any number of pivot points and any number of upper or lower portions. Applicant does not intend to be limited to any one frame.

The frame 22 also includes an upper or top cross member 32 which connects the upper portions 33 of the side frame members 30. The dunnage 24 may be secured to this cross member 32 or to a handle 38 which can be used to pull the frame 28 and the attached dunnage 24 from a collapsed position, as shown in FIG. 2 to an erected position shown in FIG. 1. Although one type of handle is illustrated, the handle may assume any other configuration or form.

The frame 28 is preferably made of metal, such as aluminum, but may be made of any other suitable material. The bottom portions 31 of frame members 30 are preferably fastened to the adjacent side portions 16a, 16c of the base 12 by appropriate fasteners, such as rivets, but may be joined in any desirable fashion. The upper portions 33 of side frame members 30 are preferably welded to cross frame member 32 to create a collapsible upper portion of the frame 28, but may be joined in any desirable fashion.

As best illustrated in FIG. 2, the container 10 further comprises a pair of dunnage erection biasers 40 operably connected to the side members 30 of the frame 28. As shown in FIGS. 1 and 2, each dunnage erection biaser 40 is located at or within the pivot or hinge joint 36 of the frame 28. However, in other embodiments, the dunnage erection biaser 32 could be located elsewhere. If desired, only one dunnage erection biaser 40 could be used.

In a preferred embodiment, each dunnage erection biaser 40 comprises a torsion spring. However, other elastic devices or materials such as rubber, or other types of springs, such as a leaf spring, could be used. As best illustrated in FIG. 2, each torsion spring or biaser 40 has a pair of legs 42, 44 protruding outwardly from a central coiled portion 46. One of the legs 42 is secured to the upper portion 33 of one of the side frame members 30 while the other leg 44 of the torsion spring 40 is secured to the lower portion 31 of one of the side frame members 30. The natural tendency or bias of the torsion spring 40 is to return the upper and lower portions 33, 31 of the side frame members 30 to their erected, aligned position shown in FIG. 1. Thus, the torsion springs 40 urge the upper portions 33 of the side frame members 30 along with the cross member 32 of the frame 28 upwardly from the collapsed position shown in FIG. 2 to the erect position shown in FIG. 1. Therefore, when an operator pulls upwardly on the handle 38 to erect the frame 28 and associated dunnage 24, the torsion springs 40 lessen the load the operator must lift and consequently make it easier to erect the collapsed portion 50 of the frame 28 and associated dunnage 24.

Referring to FIG. 2, the frame 28 is shown hinged in a collapsed position. The portion of the dunnage 24 supported by cross member 32 of frame 28 also collapses when the frame 28 is collapsed. The cross member 32 may collapse completely to the bottom or base 12 of container 10. Alternatively, a stop structure (not shown) may be position in the body to prevent the upper portions 33 of the side members 30 of the frame 28 from hinging or collapsing completely to the bottom of the container 10. In that way, a certain amount of space is maintained for the collapsed dunnage 24, which lies beneath the collapsed portion 50 of the frame 28. Generally, upper portion 33 of the side frame members 30 will not collapse below pivot joints 36.

Figure 3A:
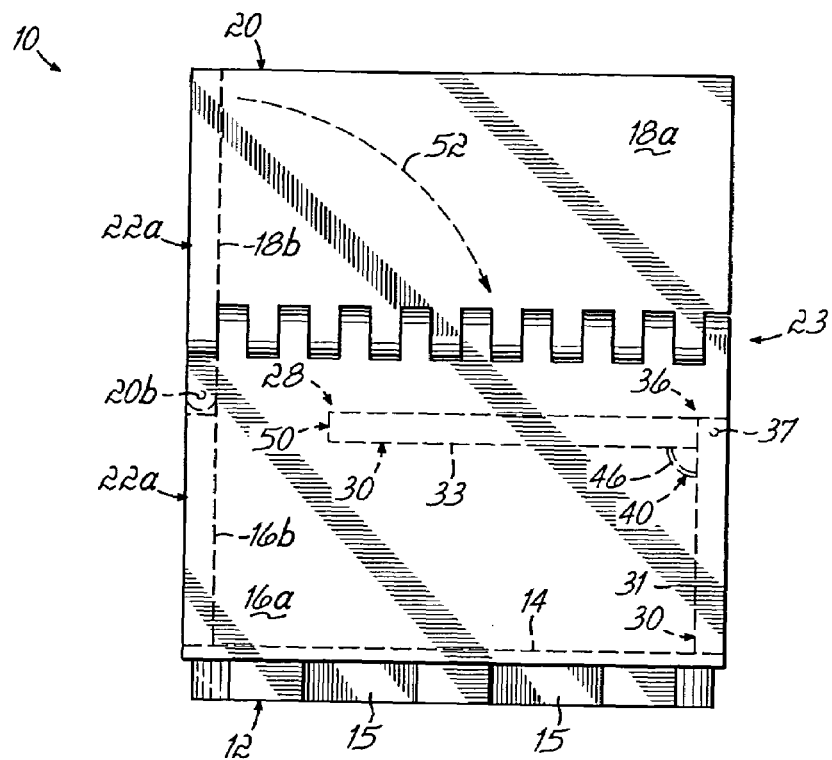
FIG. 3A is a side elevational view of the container of FIG. 1 showing the frame collapsed.
Figure 3B:
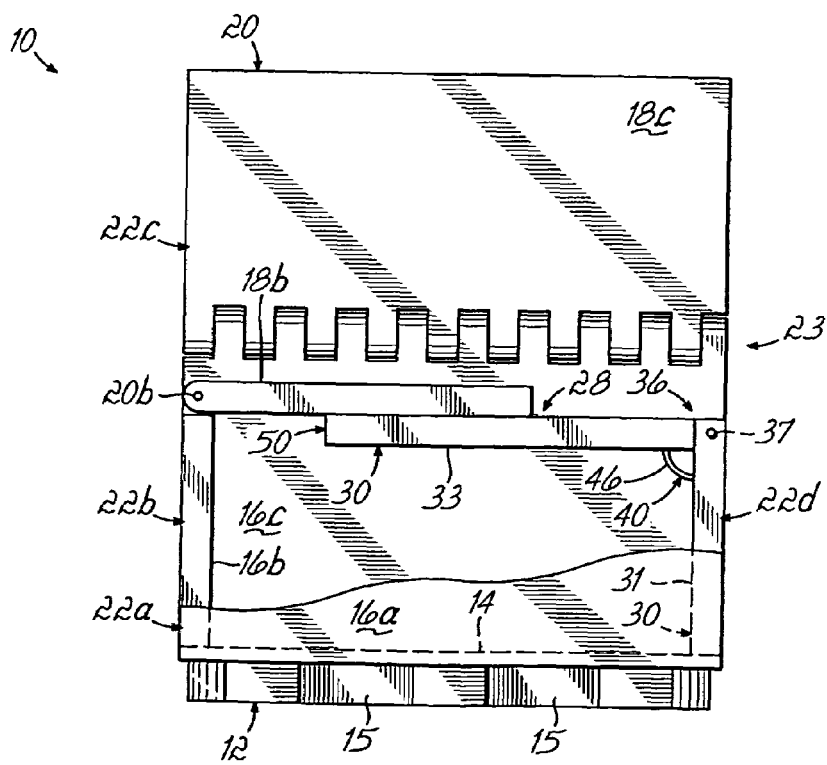
FIG. 3B is a side elevational view of the container of FIG. 1 showing the rear wall collapsed.
Figure 3C:
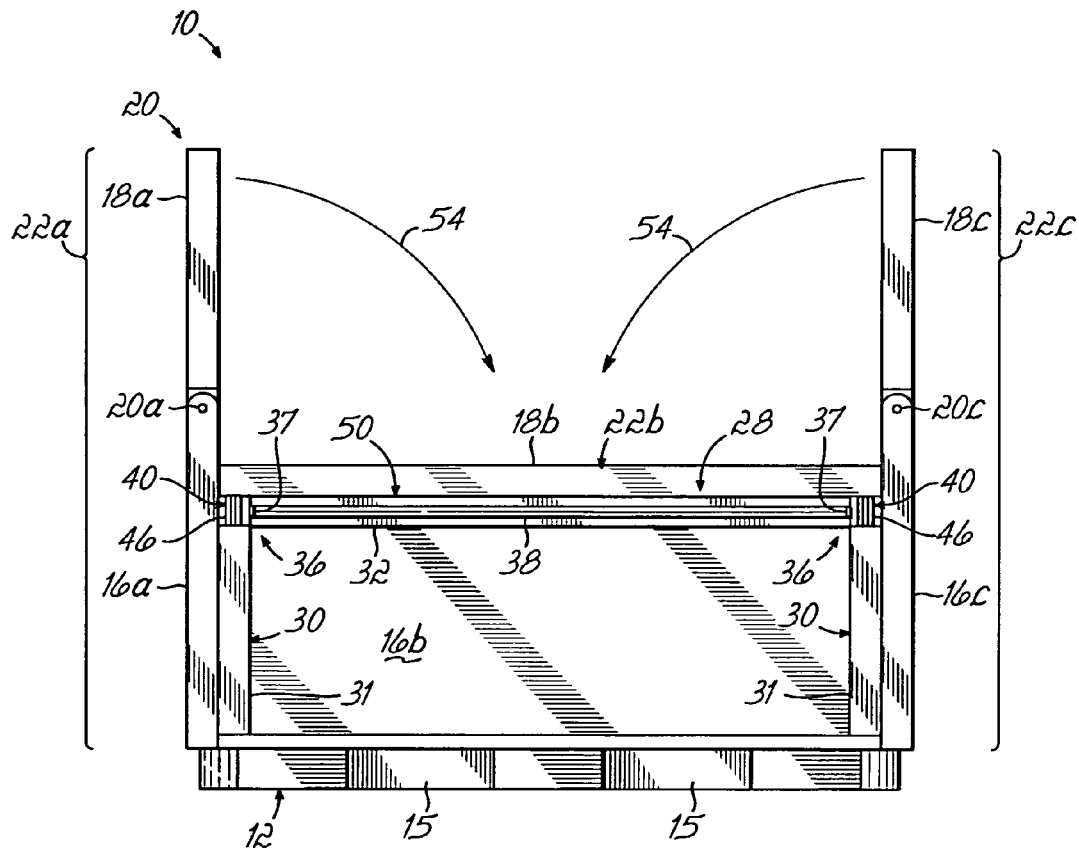
FIG. 3C is a front elevational view of the container of FIG. 1 showing the side walls being collapsed.
Figure 3D:
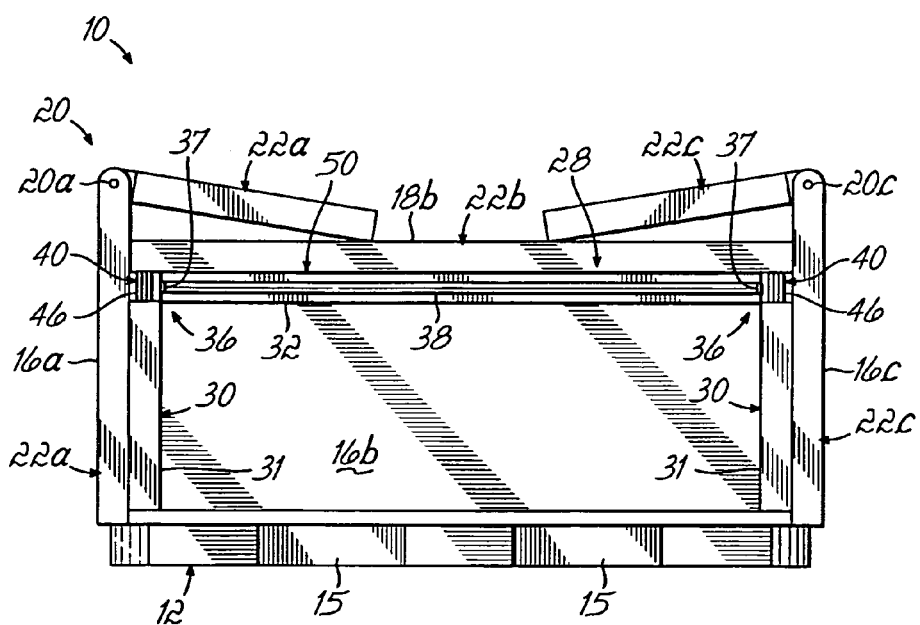
FIG. 3D is a front elevational view of the container of FIG. 1 in a collapsed position.

FIGS. 3A–3D illustrate the method of collapsing the container 10 and its associated dunnage 24. FIG. 3A illustrates an erected container 10 with the frame 28 collapsed about horizontal pivot axis 35. The walls 18a–18c remain erected. The next step after collapsing the upper portion 50 of the frame 28 is to collapse the rear wall 18b of the container 10 in the direction of arrow 52. Rear wall 18b is coupled to another end of the dunnage structure 24. Therefore, when rear wall 18b is collapsed, the dunnage structure 24 is located thereunder. FIG. 3B illustrates the partially collapsed container 10.

FIG. 3C illustrates the side walls 18a, 18c being collapsed inwardly as shown by arrows 54 to provide a completely collapsed structure, as shown in FIG. 3D. The hinge lines or hinge structures of the first-collapsing rear wall 18b are generally located below the hinge lines or structures of the latter collapsing side walls 18a, 18c, so that the side walls 18a, 18c overlie rear wall 18b and the upper, collapsed-portion 50 of the frame 28. When the container 10 is collapsed, along with the dunnage 24, as shown in FIG. 3D, the empty container may be returned in a generally 2:1 volume ratio with respect to an erected, full container. In that way, shipping and storage costs are reduced. As may be appreciated, the figures only illustrate one embodiment of a container in accordance with the aspects of the invention. Other different types of containers might be made to include the inventive features of the present invention.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A container for holding product comprising:
   a body having at least two opposed side structures;
   collapsible dunnage extending between the two opposed side structures; and
   a dunnage erection biaser for aiding movement of at least one of the side structures from a collapsed position to an erected position.

2. The container of claim 1 wherein the biaser comprises at least one spring.

3. The container of claim 1 wherein the biaser comprises a pair of springs.

4. The container of claim 1 wherein the biaser biases the at least one side structure in the erected position.

5. A container for holding product comprising:
   a body;
   a frame;
   collapsible dunnage operably connected to the frame; and
   a dunnage erection biaser operably connected to the frame for biasing said frame in an erected position.

6. The container of claim 5 wherein the frame has at least one pivotal joint.

7. The container of claim 6 wherein the biaser operably facilitates movement of the frame relative to the body.

8. The container of claim 5 wherein the biaser comprises at least one spring.

9. The container of claim 5 wherein the biaser comprises a pair of springs.

10. The container of claim 5 wherein the biaser comprises at least one torsion spring.

11. The container of claim 5 wherein the biaser comprises a pair of torsion springs.

12. A reusable and returnable container for holding product therein during shipment and then being returned for reuse, the container comprising:

a body having at least two opposing and moveable side structures which are configured for being selectively moved into an erected position for shipment and moved into a collapsed position for reducing the size of the container for return;

collapsible dunnage located within the body, the dunnage being operably coupled to the side structures and movable between an erected position for receiving product when the side structures are erected and a collapsed position when the side structures are collapsed;

a dunnage erection biaser to aid in moving one of the side structures to the erected position.

13. The container of claim 12 wherein said one of the side structures has at least one pivotal joint.

14. The container of claim 13 wherein the biaser operably facilitates movement of the pivotal joint.

15. The container of claim 12 wherein the biaser comprises at least one spring.

16. The container of claim 12 wherein the biaser comprises a pair of torsion springs.

17. The container of claim 12 wherein the biaser comprises at least one torsion spring.

18. A reusable and returnable container for holding product therein during shipment and then being returned for reuse, the container comprising:

a body having at least two opposing side structures, an upper portion of each side structure being movable between an erected position and a collapsed position;

collapsible dunnage operably coupled to the two opposing side structures and movable between an erected position for receiving product and a collapsed position when the upper portions of the side structures are collapsed;

a dunnage erection biaser operably connected to upper and lower portions of one of the side structures to facilitate erection of the side structure.

19. The container of claim 18 wherein the biaser comprises at least one spring.

20. The container of claim 18 wherein the biaser is a pair of torsion springs.

21. A container, being selectively moveable between an erect condition with side walls upstanding from a base, and a collapsed condition with the side walls lying generally flat, the container comprising:

a body having three moveable side walls movable between an erected position for shipment and a collapsed position for reducing the size of the container for return;

a frame section movable between a collapsed position and an erected position: and springs to aid in moving the frame section to the erected position.

22. The container of claim 21 further comprising collapsible dunnage located within the body, the dunnage being operably coupled to the frame section for moving the dunnage between an erected position when the side structures are erected and a collapsed position when the side structures are collapsed.

23. The container of claim 22 wherein the springs facilitate movement of the frame section relative to the body.

24. The container of claim 21 wherein the springs are torsion springs.

* * * * *

UNITED STATES PATENT AND TRADEMARK OFFICE
CERTIFICATE OF CORRECTION

PATENT NO. : 7,083,369 B2
APPLICATION NO. : 11/006958
DATED : August 1, 2006
INVENTOR(S) : Calvin D. Nyeboer It is certified that error appears in the above-identified patent and that said Letters Patent is hereby corrected as shown below:

Column 1

Line 65, change "and thus," to --and thus--.

Column 2

Line 56, change "removing a parts" to --removing parts--.

Line 57, change "Because," to --Because--.

Column 3

Line 9, change "heaver" to --heavier--.

Line 36, change "one or springs" to --one or more springs--.

Column 5

Line 14, insert a "period (.)" after "FIG. 3A".

Line 35, delete the "period (.)" after "Container".

Column 6

Line 53, change "define" to --defines--.

Column 7

Line 52, change "position" to --positioned--.

Column 8

Line 27, add a "comma ( ,)" after "details".

Column 9

Line 1, change "moveable" to --movable--.

UNITED STATES PATENT AND TRADEMARK OFFICE
CERTIFICATE OF CORRECTION

PATENT NO. : 7,083,369 B2
APPLICATION NO. : 11/006958
DATED : August 1, 2006
INVENTOR(S) : Calvin D. Nyeboer It is certified that error appears in the above-identified patent and that said Letters Patent is hereby corrected as shown below:

Column 10

Line 8, change "moveable" to --movable--.

Line 12, change "moveable" to --movable--.

Line 17, change "position:" to --position;--.

Signed and Sealed this

Twenty-sixth Day of December, 2006

JON W. DUDAS
*Director of the United States Patent and Trademark Office*